Figure 1:
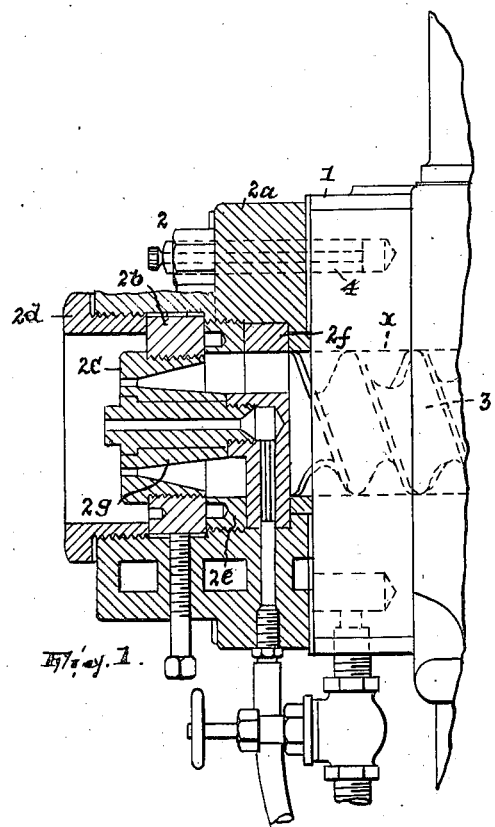

April 13, 1943. J. H. RAMSEY 2,316,720
SECURING MEANS FOR ELEMENTS OF EXTRUSION MACHINES
Filed June 27, 1942

INVENTOR,
Justin H. Ramsey,
BY
John Steward,
ATTORNEY.

Patented Apr. 13, 1943

2,316,720

UNITED STATES PATENT OFFICE 2,316,720

SECURING MEANS FOR ELEMENTS OF EXTRUSION MACHINES

Justin H. Ramsey, Allendale, N. J.

Application June 27, 1942, Serial No. 448,727

5 Claims. (Cl. 85—1)

In my application Serial No. 431,781 an extrusion machine is set forth including a body formed with a bore open at one end and an intake leading to the bore, an extruding-die-including member connected to the body and having its die opposed to displacement of the material to be extruded toward said end of the bore, and means to displace the material through the bore and die including a screw rotative in the bore and supported by said body against displacement from the die, the connection between said body and member being the weakest part of so much of the structure comprising them as is subjected to strain incident to displacement of the material through the die by the screw, whereby such stretching or actual parting as the strain may cause is so localized that repair can be effected with facility and quickly. The present invention is related to the foregoing and its purpose may be thus briefly indicated:

Given any two elements (as said body and member) to be subjected to strain tending to separate them and one having means, anchored thereto (preferably separably) and extending past and abutting a surface of the other which faces away from the first-named element, for securing said elements together, according to my invention in its preferred form said means is weakened and thus adapted to yield between where it is anchored to the first-named element and where said means abuts said surface and said structure includes, anchored to one of said elements against tension strain and projecting past the weakening, an extension providing a stop opposed to a surface of said means which is beyond the weakening relatively to and faces away from the first-named element. Thereby, if complete parting of said means occurs as an incident of strain, its portion beyond the weakening will be checked in its flight, eliminating its danger as a missile, which is considerable in the case of an extruding machine where the pressure developed is frequently several thousand pounds.

Usually said means will be in the form of a device separable from said element, as a stud penetrating both of them.

Figure 2:
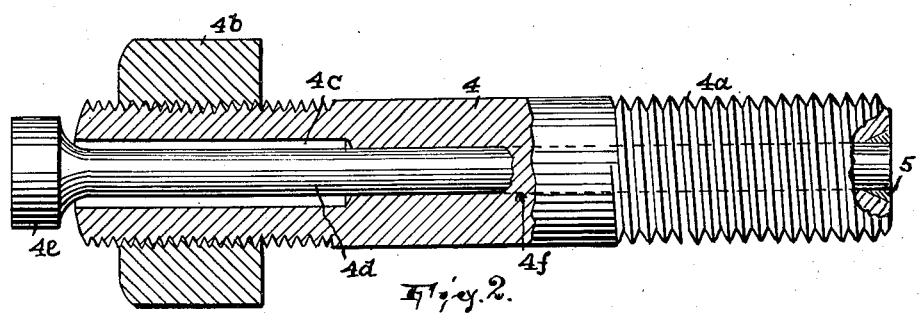

In the drawing,

Fig. 1 shows, partly in elevation and partly in section, the delivery end portion of an extruding machine embodying the present invention; and Fig. 2 shows, also partly in elevation and partly in section, one of the mentioned studs.

Let 1 be one of two elements to be subjected to strain tending to separate them and all that is shown to the left of it in Fig. 1, designated 2, be the other such element, element 1 being here the body and element 2 the extruding-die-including head of an extruding machine. The body has the usual bore $x$ in which is the screw 3 and an intake leading to the bore through which to feed to the latter the material to be extruded and it also has means to support the screw against thrust to the right, such intake and means being not here shown. Element 2 here includes the head proper 2a; an annular holder 2b for the annular part 2c of the die, held in place by a binder-nut 2d; a spacer 2e; and a holder in the form of a spider 2f for the die core 2g, parts 2c and 2f of the die providing an annular tapering extruding passage.

Elements 1 and 2 are secured together by studs each including a body part 4 having one end portion, as 4a, providing some form of anchorage, as here threading. The other end portion of the body part provides a head 4b, being in the example a nut screwed thereon. The body part is in this example to have its threaded portion 4a screwed into element 1 (but it may be in any way anchored, that is to say, fixed or fast, thereto against tension strain) and is to extend freely through the head proper of element 2, the two elements being then secured together by screwing nut 4b on said body part.

The body part is weakened between its anchorage-including portion and its head, as by a bore 4c extending axially therein from its end which adjoins the head to a point that will be between said portion and head when the stud and said elements are assembled. Each stud also includes an axial extension 4d, in the form of a stem, reaching from the portion of the body part providing the latter's anchorage through and protruding from the bore, its free end being formed with a stop 4e opposed to a surface (here the actual free end surface) of the remaining portion of said body part, such stop being in this example a head coaxial with and of greater diameter than the bore. In the example the stem is assumed to be a part separately formed, though existing in the completed stud as an integral and rigid part thereof. That is, the body part may be regarded as having an axial extension-bore 4f reaching clear to the free end of its anchorage-including portion and having the stem extending through and fitting it, the stem being spot-welded to the stud proper at 5. However, it may be anchored to the body part in any way against tension strain. Since said element includes, anchored thereto, the stud, the stem may be regarded, as already indicated, as anchored to one such element, though in the example it is anchored directly to the stud.

A suitable number of the studs, arranged concentrically with the die, are used to secure elements 1 and 2 together. As set forth in my said application, if the pressure developed by the screw within the screw-bore attains the degree sufficient to separate elements 1 and 2 usually one or more of the studs, weakened as described, will stretch somewhat instead of actually parting, thus providing a crevice between said elements whereat the material being extruded will ooze and thus afford a signal to the attendant. But, according to the present invention, if the body part of a stud should suddenly part, which would usually mean that its outer end portion would be discharged with such force that it would be a dangerous missile, its flight would be checked by the head 4e of the stem.

Having thus fully described my invention, what I claim is:

1. Structure comprising elements to be subjected to strain tending to separate them and one including means, anchored thereto and extending past and abutting a surface of the other element which faces away from the first-named element, for securing them together, said structure having said means as the weakest part thereof which is subjected to said strain and said structure also including, anchored to one of said elements against tension strain, means providing a stop opposed to a surface of the first-named means which faces away from the first-named element.

2. Structure including elements to be subjected to strain tending to separate them and one including means, anchored thereto and extending past and abutting a surface of the other element which faces away from the first-named element, for securing said elements together, said means being locally weakened between where it is anchored to the first-named element and where said means abuts said surface, and said structure also including, anchored to one of said elements against tension strain, means providing a stop opposed to a surface of the first-named means which faces away from the first-named element.

3. The hereindescribed device for securing elements together against strain tending to part them including, with a body part having alined portions respectively providing an anchorage and a head and being weakened between the anchorage and head, an extension extending from and anchored against tension strain to the portion providing the anchorage and having a stop beyond and opposed to a surface of the other of said portions which faces away from said portion providing the anchorage.

4. The hereindescribed stud for securing elements together against strain tending to part them including, with a body part having axially alined portions respectively providing an anchorage and a head itself providing an exterior shoulder facing toward the portion providing the anchorage, a stem projecting longitudinally of and through the body part from the portion providing the anchorage and past and having a stop opposed to the free end of the other portion and said stem being confined to the portion providing the anchorage against displacement in the direction in which said stem projects, that portion of the body part which, on parting of the latter between said shoulder and the portion providing the anchorage, is beyond the shoulder relatively to the latter portion being free of the stem to undergo displacement lengthwise of the stud.

5. The stud set forth in claim 4 characterized by said stop being spaced from the free end of said other portion of the body part.

JUSTIN H. RAMSEY.